United States Patent
Sturdevant et al.

(10) Patent No.: US 9,619,081 B2
(45) Date of Patent: Apr. 11, 2017

(54) USING DYNAMICALLY SCALED LINEAR CORRECTION TO IMPROVE FINGER TRACKING LINEARITY ON TOUCH SENSORS

(71) Applicant: CIRQUE CORPORATION, Salt Lake City, UT (US)

(72) Inventors: Scott Sturdevant, Roy, UT (US); David C. Taylor, West Jordan, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/613,606

(22) Filed: Feb. 4, 2015

(65) Prior Publication Data
US 2015/0220210 A1    Aug. 6, 2015

Related U.S. Application Data

(60) Provisional application No. 61/935,641, filed on Feb. 4, 2014.

(51) Int. Cl.
*G06F 3/044* (2006.01)
*G06F 3/041* (2006.01)

(52) U.S. Cl.
CPC .......... *G06F 3/0418* (2013.01); *G06F 3/044* (2013.01)

(58) Field of Classification Search
CPC .............................. G06F 3/0418; G06F 3/044
USPC ........................................................... 345/178
See application file for complete search history.

(56) References Cited

U.S. PATENT DOCUMENTS

| | | | |
|---|---|---|---|
| 5,511,012 A * | 4/1996 | Deville | H03J 3/32 333/166 |
| 6,456,953 B1 | 9/2002 | Peruffo | |
| 9,195,351 B1 * | 11/2015 | Rosenberg | G06F 1/1626 |
| 2012/0098783 A1 | 4/2012 | Badaye | |
| 2012/0206407 A1 * | 8/2012 | Taylor | G06F 3/044 345/174 |
| 2012/0293453 A1 * | 11/2012 | Yamada | G06F 3/0416 345/174 |
| 2014/0022201 A1 * | 1/2014 | Boychuk | G06F 3/041 345/174 |

* cited by examiner

*Primary Examiner* — Andrew Sasinowski
*Assistant Examiner* — Chineyere Wills-Burns
(74) *Attorney, Agent, or Firm* — Morriss O'Bryant Compagni, PC

(57) ABSTRACT

A system and method for correcting non-linear tracking of objects that may change size when moving on a large touch sensor having a relatively large space between electrodes by dynamic compensating on-the-fly by constantly calculating the size of a finger as measured by the touch sensor, and then scaling that measured size so that look-up tables may be used to compensate for any size finger in the X and Y axes.

7 Claims, 4 Drawing Sheets

| Index | 8mm YLC | Index | 8mm YLC | Index | 8mm YLC | Index | 8mm YLC | Index | 8mm YLC | Index | 8mm YLC | Index | 8mm YLC |
|---|---|---|---|---|---|---|---|---|---|---|---|---|---|
| 0 | 1 | 41 | 60 | 82 | 97 | 123 | 125 | 164 | 153 | 205 | 186 | 246 | 239 |
| 1 | 2 | 42 | 61 | 83 | 97 | 124 | 125 | 165 | 153 | 206 | 187 | 247 | 240 |
| 2 | 4 | 43 | 62 | 84 | 98 | 125 | 126 | 166 | 154 | 207 | 188 | 248 | 242 |
| 3 | 6 | 44 | 63 | 85 | 99 | 126 | 127 | 167 | 155 | 208 | 189 | 249 | 244 |
| 4 | 8 | 45 | 65 | 86 | 100 | 127 | 127 | 168 | 155 | 209 | 190 | 250 | 246 |
| 5 | 10 | 46 | 66 | 87 | 100 | 128 | 128 | 169 | 156 | 210 | 191 | 251 | 247 |
| 6 | 11 | 47 | 66 | 88 | 101 | 129 | 129 | 170 | 157 | 211 | 192 | 252 | 249 |
| 7 | 13 | 48 | 67 | 89 | 102 | 130 | 129 | 171 | 158 | 212 | 193 | 253 | 251 |
| 8 | 15 | 49 | 68 | 90 | 103 | 131 | 130 | 172 | 158 | 213 | 194 | 254 | 254 |
| 9 | 16 | 50 | 69 | 91 | 103 | 132 | 130 | 173 | 159 | 214 | 195 | 255 | 255 |
| 10 | 18 | 51 | 70 | 92 | 104 | 133 | 131 | 174 | 160 | 215 | 196 | | |
| 11 | 20 | 52 | 71 | 93 | 105 | 134 | 132 | 175 | 161 | 216 | 197 | | |
| 12 | 22 | 53 | 72 | 94 | 105 | 135 | 132 | 176 | 161 | 217 | 198 | | |
| 13 | 23 | 54 | 73 | 95 | 106 | 136 | 133 | 177 | 162 | 218 | 199 | | |
| 14 | 25 | 55 | 74 | 96 | 107 | 137 | 134 | 178 | 163 | 219 | 201 | | |
| 15 | 27 | 56 | 75 | 97 | 107 | 138 | 134 | 179 | 164 | 220 | 202 | | |
| 16 | 28 | 57 | 76 | 98 | 108 | 139 | 135 | 180 | 164 | 221 | 203 | | |
| 17 | 30 | 58 | 77 | 99 | 109 | 140 | 136 | 181 | 165 | 222 | 204 | | |
| 18 | 32 | 59 | 78 | 100 | 109 | 141 | 136 | 182 | 166 | 223 | 205 | | |
| 19 | 33 | 60 | 79 | 101 | 110 | 142 | 137 | 183 | 167 | 224 | 207 | | |
| 20 | 35 | 61 | 80 | 102 | 111 | 143 | 138 | 184 | 168 | 225 | 208 | | |
| 21 | 36 | 62 | 81 | 103 | 111 | 144 | 138 | 185 | 168 | 226 | 209 | | |
| 22 | 37 | 63 | 81 | 104 | 112 | 145 | 139 | 186 | 169 | 227 | 210 | | |
| 23 | 39 | 64 | 82 | 105 | 113 | 146 | 140 | 187 | 170 | 228 | 212 | | |
| 24 | 40 | 65 | 83 | 106 | 113 | 147 | 141 | 188 | 171 | 229 | 213 | | |
| 25 | 42 | 66 | 84 | 107 | 114 | 148 | 141 | 189 | 172 | 230 | 214 | | |
| 26 | 43 | 67 | 85 | 108 | 115 | 149 | 142 | 190 | 173 | 231 | 215 | | |
| 27 | 44 | 68 | 86 | 109 | 115 | 150 | 143 | 191 | 174 | 232 | 216 | | |
| 28 | 46 | 69 | 86 | 110 | 116 | 151 | 143 | 192 | 175 | 233 | 218 | | |
| 29 | 47 | 70 | 87 | 111 | 117 | 152 | 144 | 193 | 175 | 234 | 219 | | |
| 30 | 48 | 71 | 88 | 112 | 117 | 153 | 145 | 194 | 176 | 235 | 221 | | |
| 31 | 49 | 72 | 89 | 113 | 118 | 154 | 145 | 195 | 177 | 236 | 222 | | |
| 32 | 50 | 73 | 90 | 114 | 119 | 155 | 146 | 196 | 178 | 237 | 224 | | |
| 33 | 51 | 74 | 90 | 115 | 119 | 156 | 147 | 197 | 179 | 238 | 225 | | |
| 34 | 52 | 75 | 91 | 116 | 120 | 157 | 148 | 198 | 180 | 239 | 227 | | |
| 35 | 54 | 76 | 92 | 117 | 121 | 158 | 148 | 199 | 180 | 240 | 229 | | |
| 36 | 55 | 77 | 93 | 118 | 121 | 159 | 149 | 200 | 181 | 241 | 230 | | |
| 37 | 56 | 78 | 93 | 119 | 122 | 160 | 150 | 201 | 182 | 242 | 232 | | |
| 38 | 57 | 79 | 94 | 120 | 123 | 161 | 150 | 202 | 183 | 243 | 234 | | |
| 39 | 58 | 80 | 95 | 121 | 123 | 162 | 151 | 203 | 184 | 244 | 236 | | |
| 40 | 59 | 81 | 96 | 122 | 124 | 163 | 152 | 204 | 185 | 245 | 237 | | |

FIGURE 4

USING DYNAMICALLY SCALED LINEAR CORRECTION TO IMPROVE FINGER TRACKING LINEARITY ON TOUCH SENSORS

BACKGROUND OF THE INVENTION

Field of the Invention

This invention relates generally to touch sensors. Specifically, the invention pertains to large touch sensors that have relatively wider spacing between electrodes that may result in non-linear tracking and being corrected by applying a correction that is scaled on-the-fly based on a measured finger size.

Description of Related Art

There are several designs for capacitance sensitive touch sensors. It is useful to examine the underlying technology to better understand how any capacitance sensitive touchpad may be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 may not yet determine on which side of the row electrode the pointing object is located, nor may the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode may actually be the X or Y electrodes 12, 14 by using multiplexing.

On large touch sensors with wide electrode spacing it is difficult to correctly track small fingers without the resulting cursor movement having some non-linearity issues. When using a pen or stylus that has a fixed size as measured by the touch sensor, it is possible to use two linear correction lookup tables to compensate in the X and Y axes. Unfortunately, this method fails to correct for non-linearity if the pointing object being tracked, such as a finger, changes size as it moves. This is due to the finger size not being constant. The size of a finger will vary from user to user, and even vary as a user moves their finger across the surface of the sensor.

Accordingly, what is needed is a way to be able to compensate for objects that change size while moving and generate a linear response for movement as it is being tracked on a large touch sensor.

BRIEF SUMMARY OF THE INVENTION

In a first embodiment, the present invention is a system and method for correcting non-linear tracking of objects that may change size when moving on a large touch sensor having a relatively large space between electrodes by dynamic compensating on-the-fly by constantly calculating the size of a finger as measured by the touch sensor, and then scaling that measured size so that look-up tables may be used to compensate for any size finger in the X and Y axes.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 4 is a Linear Correction table that is used in the first embodiment of the present invention.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document may be used interchangeably with "proximity sensor", "touch sensor", "touch and proximity sensor", "touch panel", "touchpad" and "touch screen".

The present invention is directed to improving operation by decreasing a non-linear response of a large touch sensor having wide electrode spacing. A large touch sensor having wide spacing may be defined as a touch sensor where the space between parallel electrodes on a same plane is close to or wider than the minimum width of a finger or other pointing object that is being detected. More specifically, the typically equidistant space between each of the X electrodes or the equidistant space between each of the Y electrodes is referred to as the pitch of the electrodes. If the pitch of the electrodes is approaching the size of the finger being tracked, then the finger starts to have less of an effect on adjacent electrodes. The result is that the response from the touch sensor for a finger moving in a diagonal straight line across the touch sensor will appear to be moving in a step-wise fashion. More generally, the response of the touch sensor may be defined as non-linear.

It should be understood that the touch sensor will not give a non-linear response for all fingers or pointing objects (hereinafter referred to simply as a finger) that make contact with the touch sensor. For example, if the finger is much larger than the pitch, then the response of the touch sensor may be linear. Accordingly, the present invention is for correcting a substantially non-linear response by the touch sensor, where a substantially non-linear response is any response that may cause a finger that is moving in a straight line to have a response that is not linear.

The pitch may also affect the response of the touch sensor when the pitch is much larger or much smaller than the finger width.

Figure 1:
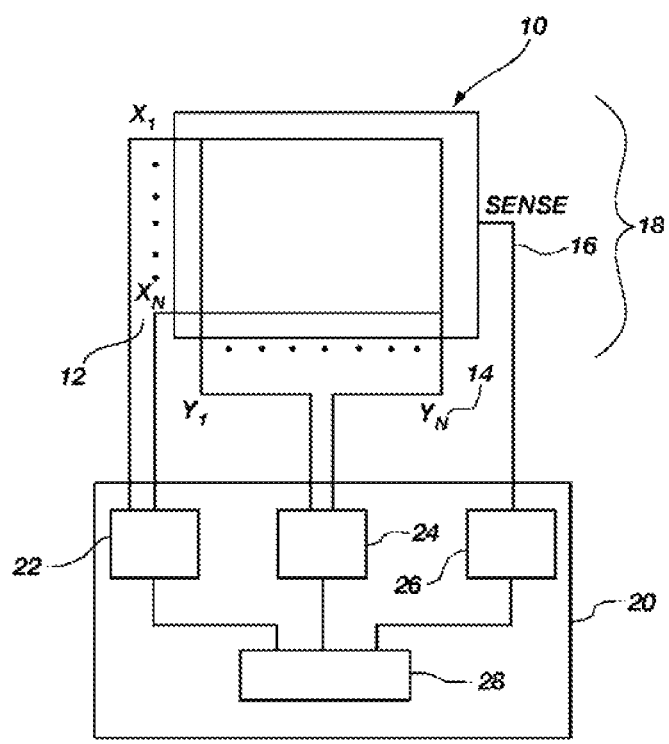
FIG. 1 is a block diagram of the components of a capacitance-sensitive touchpad as made by CIRQUE® Corporation and which may be operated in accordance with the principles of the present invention.
Figure 2:
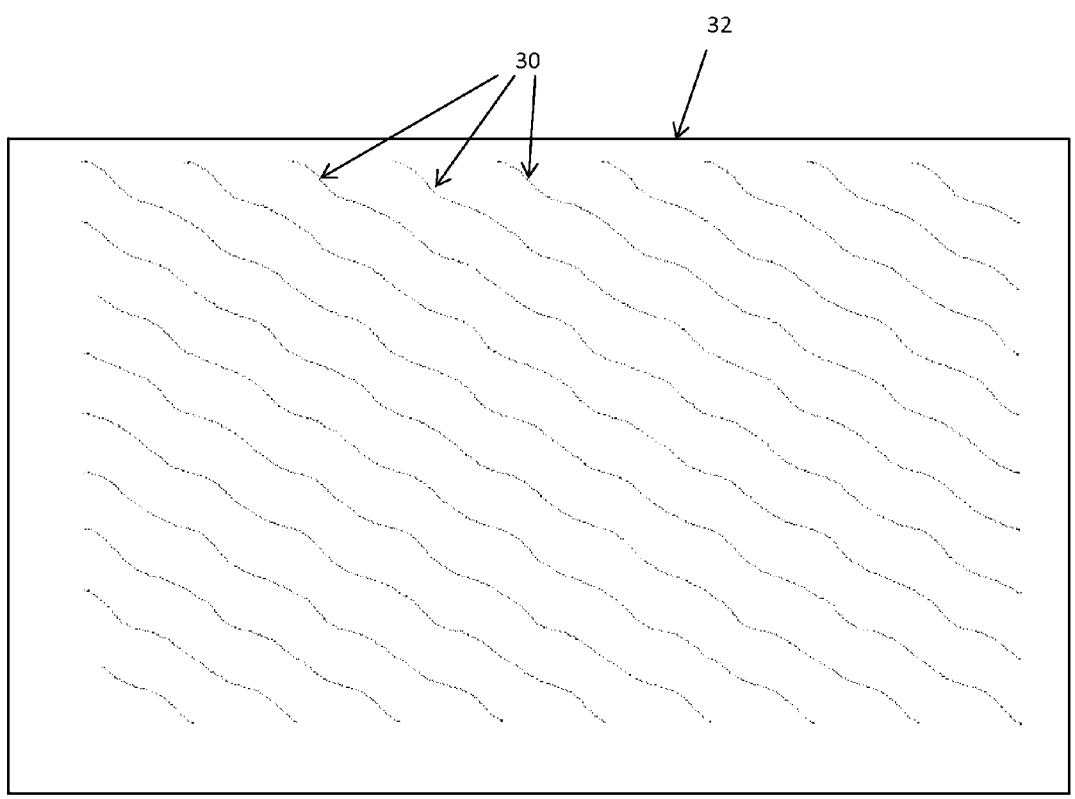
FIG. 2 is an illustration of parallel finger movements across the surface of a large touch sensor having wide spacing or pitch between the electrodes as defined herein.

FIG. 2 is an illustration of the prior art. Specifically, the lines 30 shown on a display 32 represent tracking of a finger moving in parallel diagonal lines on a surface of a touch sensor (not shown). The lines 30 have a fluctuating or wavy appearance instead of being straight lines. The pitch of the touch sensor is close to the finger width. In this example, the pitch of the X and the Y electrodes is approximately 8 mm. The pointing object has an exact and never changing diameter of 8 mm in order to illustrate the problem solved by the present invention.

Figure 3:
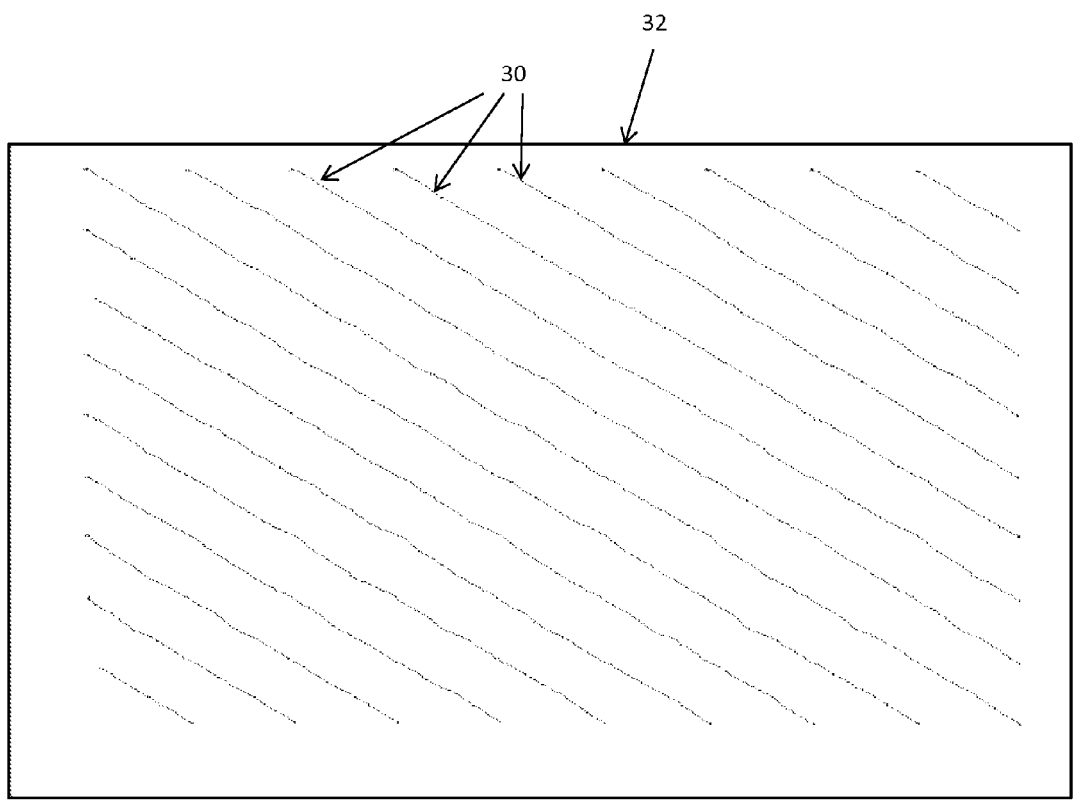
FIG. 3 is an illustration of the same parallel finger movements across the surface of the large touch sensor having a wide pitch between electrodes, but using the first embodiment of the present invention to correct for inaccuracies in measurements caused by the wide pitch.

FIG. 3 is an illustration of the lines 30 on a display 32 representing tracking of the finger used in FIG. 2, but applying the principles of the present invention. The lines are now much straighter and illustrate the linear correction being applied by the first embodiment.

The first embodiment of the present invention begins by first measuring the size of the finger that is detected by the touch sensor. The rate at which the size is calculated is not a limitation of the present invention. The hardware of the touch sensor may be assumed to be capable of performing the desired calculations without causing a delay in operation of the touch sensor. The size of the finger may be recalculated from one up to 1000 times per second. The size of the finger may be determined for each calculation that is performed to determine the corrected position of the finger.

After measuring the size of the finger, the next step is to determine a scale factor. The scale factor is used to scale the measured size of the finger so that a single look-up table may be used for determining the linear correction to be applied to the location of the finger on the touch sensor. Accordingly, all measurements made for determining the size of the finger are always scaled so that the linear correction is always applied as if the size of the finger was constant.

The scale factor that is applied to the measured finger is calculated on-the-fly so that the linear correction applied to the position calculation is consistent. Consistency in applying an accurate scale factor is maintained even as the finger changes size as it moves along the surface of the touch sensor. For example, a finger may change size when a user presses harder or lighter on the touch sensor, causing more or less deformation of the fingertip.

Once the scale factor is determined, the scale factor is applied to a look-up table. In the first embodiment, the look-up table may be generated for the smallest finger size that is going to be detected by the touch sensor. The scale factor is then used to determine how much larger or smaller the linear correction to be applied is going to be. In other words, the scale factor will not change the linear correction if the measured finger size is the same as finger size used to create the linear correction table. However, the scale factor increases or decreases as the size of the measured finger is found to be larger or smaller than the size used for the linear correction look-up table.

In this first embodiment, it may be assumed that the smallest finger is 8 mm. However, it should be understood that the finger or other pointing object being tracked may actually be smaller. A look-up table must be used that is calibrated for the smallest object that may be tracked by the touch sensor.

As the finger is being tracked, the reported location (from direct touch sensor measurements) is compared to the corrected location that is calculated using the linear correction look-up table. The first embodiment may be effectively scaling down the amount of correction that needs to be applied because the response of the touch sensor is less non-linear as the finger size increases. As the finger size increases, the finger becomes much larger than the pitch of the electrodes, the non-linearity decreases and correction becomes less and less necessary.

One benefit of the first embodiment is the ability to provide large touch sensors having wider electrode spacing than would be possible without the ability of the present invention to perform linear correction. Thus, a large touch sensor may be manufactured without having to increase the number of electrodes and still achieve the same performance.

A detailed example where the linear correction is applied to a large touch sensor is given. The first step may be to generate four values that are constants needed in the calculations. The constants are unique to a specific touch sensor, but only have to be determined once for a touch sensor having a certain pitch. The constants are ScaleSlope1, ScaleSlope2, 8mmYraw and 1mmDelta. These constants are determined as follows.

The values 8mmYraw and 1mmDelta are essentially calculations of signal strength. Their values may be obtained empirically from the touch sensor. Thus, an 8 mm finger may generate a signal that is approximately 9000 units which is the value assigned to the smallest finger for which the first embodiment is designed, in this example, to provide linear correction. The value may actually be slightly higher, but the difference is not relevant. The value of 9000 is close enough for the first embodiment to operate correctly. Likewise, the value of 1300 units for 1mmDelta is the difference in signal strength for an object of 1 mm in size larger than the 8 mm finger as detected by the touch sensor.

The constants ScaleSlope1 and ScaleSlope2 are coefficients used in a formula to determine the scale factor for a specific size of a finger. ScaleSlope1 and ScaleSlope2 are calculated by doing a linear regression on a line representing the amount of scaling needed to the data in a lookup table for different size fingers. Assume that there is data that represents the response of the touch sensor to a finger that does not have to be corrected, and that data is represented by a straight line. The linear regression function $y=C0+C1*x$, where x is the x coordinate, is used to calculate how much the data for a specific finger size needs to be scaled down to match the straight line where no correction is needed.

For example, the smallest finger size (requiring the most correction) would represent a scale of 1. A slightly larger finger would require less correction, so the amount of correction needed might be 0.9. An even larger finger might need a scale factor of 0.75. These scale factor values may be used to generate a line that represents the finger size versus the scale factor value. Performing a linear regression on this data will generate the constants used to be able to take any finger size and calculate the scale factor to use. The actual scale factor values used are calculated for each new touch sensor. The scale factor values are calculated by comparing the correction needed for a number of different size fingers on the same sensor.

Once it was determined how the lines from each of these fingers sizes had to be scaled in order to match the desired response, this data was then used in the linear regression function to obtain two other coefficients, ScaleSlope1, ScaleSlope2.

Once the constants have been calculated, they may be used for any touch sensor having the same pitch and dielectric properties, and do not need to be recalculated. For the following example, the constants are determined to be as follows.

ScaleSlope1=0.9976
ScaleSlope2=−0.2596
8mmYraw=9000
1mmDelta=1300

It should be understood that the calculations below are used to obtain a position of the finger in the Y axis of the touch sensor electrodes. However, the same principles are applied to obtain a position of the finger in the X axis.

The first step is to obtain a measured Y position before linear correction is applied. In this example, Y Raw is found to be 1722 counts. This value is obtained from the touch sensor circuitry. A typical size of a large touch sensor as made by Cirque® Corporation may be 4000 counts across. However, this size should not be considered as limiting. Counts are similar to pixels if trying to compare to a touch screen.

The second step is to measure the size of the finger using the formula:

$$Size=(YRaw-8mmYraw)/1mmDelta$$

where Y Raw is the signal strength of a finger that is 10 mm in size, or 11670 units, 8mmYraw is the constant representing the signal strength of the smallest finger that the system may be able to correct. The Size is determined to be 2.053846. In other words, based on the signal strength from the finger that is being measured, the finger is 2.053846 mm larger than the base finger, which is the 8 mm finger. Thus, the finger is 10.053846 mm in size.

The third step is to calculate a ScaleFactor using the formula:

$$ScaleFactor=ScaleSlope1+(Size*ScaleSlope2)$$

where the ScaleFactor was determined to be 0.464422. In other words, the ScaleFactor that is going to be applied to determine the amount of correction to add to the measured position of finger in the Y axis is 0.464422. It should be noted that this is less correction than if the finger was 9 mm or 8 mm in size.

The third step is to calculate an ElectrodeCount using the formula:

$$ElectrodeCount=Measured\ Y\ Position/256$$

where the ElectrodeCount is determined to be 6.726563.

The next step is to separate the integer portion of the ElectrodeCount from the fractional portion. The integer portion or Electrode is 6, and the fractional portion or Index is 0.726563.

The next step is to determine the IndexCount using the formula:

$$IndexCount=Index*256$$

where IndexCount is calculated to be 186.

The next step is use a Linear Correction table to determine the amount of linear correction to apply to the measured position. Typically, the IndexCount value of 186 may be used to locate a corresponding correction value in the look-up table.

FIG. 4 is the Linear Correction table that may be used in the first embodiment. It is a simple look-up table that may be used to find the actual Y location for every possible measured Y location. Because the measured finger has now been scaled as if it were an 8 mm finger, the value obtained is the amount of linear correction to be applied to a measured position. In this example, the IndexCount value of 186 is used to locate a corresponding new value of 169. The difference in these two positions represents the amount of correction needed for an 8 mm finger.

The next step is to use the formula:

$$DeltaCorrection=8mmLC\ Value-IndexCount$$

where DeltaCorrection is calculated to be 169-186 which is −17.

The next step is to obtain a scaled correction value that is correction for the finger size that was actually measured, by using the formula:

$$ScaledCorrection=DeltaCorrection*ScaleFactor$$

where ScaledCorrection=−7.89517.

The next step is to obtain a CorrectedIndex value using the formula:

$$CorrectedIndex=ScaledCorrection+IndexCount$$

where CorrectedIndex=178.1048.

The final step is to obtain the new position of the finger. This is done using the formula:

NewPosition=intpart(CorrectedIndex)+(Electrode*256)

where NewPosition=1714. The measured Y Position was 1722 compared to the actual Y Position of 1714.

The next step may be to perform the same calculations but for the measurement made in the X axis instead of the Y axis shown above. By performing the linear correction algorithm in both axes, the touch sensor may correct the position for any size finger that is measured by the touch sensor.

The present invention may also be capable of performing the same calculations simultaneously for multiple fingers. Thus, the present invention may also function for multi-touch applications as well as single finger applications.

The first embodiment enables the present invention to provide linear correction for a touch sensor having a very wide pitch between the electrodes. Thus, the first embodiment provides the ability to make linear corrections on sensors that have an electrode pitch that is close to the finger width, or even wider than the finger width. Thus, the first embodiment enables a single integrated touch measurement circuit to be able to operate with larger touch sensors that previously required multiple touch measurement circuits.

The present invention may be implemented in firmware, thus making the calculations and position correcting a rapid process, or between one and 2000 times per second.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for compensating for a non-linear response from a touch sensor when a pitch between electrodes is approximately equal to the width of the pointing object making contact, said method comprised of:
   1) providing a touch sensor having a orthogonal array of X and Y electrodes disposed in two parallel planes, one plane directly over the other plane, wherein the pitch between electrodes on the same plane is approximately equal to or wider than the width of the pointing object as measured by the touch sensor;
   2) providing a linear correction table that is calibrated for a predetermined size of an object that will experience non-linearity on the touch sensor;
   3) measuring the size of the pointing object that is detected by the touch sensor, and measuring a position of the pointing object in a first axis;
   4) determining a scale factor relative to the measured size of the pointing object so that the linear correction table may be used for correcting a measured position of the pointing object;
   5) applying the scale factor to the linear correction table to find an amount of correction to be applied to the measured position of the pointing object to determine an actual position relative to the first axis and the measured size of the pointing object; and
   6) repeating steps 3 through 5 for a second axis in order to determine an actual position relative to the second axis and the measured size of the pointing object.

2. The method as defined in claim 1 wherein the method further comprises calibrating the linear correction table for an object of predetermined size that will be used on the touch sensor and which will cause non-linearity on the touch sensor.

3. The method as defined in claim 1 wherein the method further comprises creating the linear correction table by determining a strength of a signal as measured by the touch sensor that is generated by the object having the predetermined size.

4. The method as defined in claim 3 wherein the method further comprises finding two coefficients used in a linear regression function to determine the slope of a line for the predetermined size for the object having the predetermined size.

5. The method as defined in claim 4 wherein the method further comprises determining the size of the pointing object relative to the object of the predetermined size used to generate the linear correction table.

6. The method as defined in claim 5 wherein the method further comprises calculating a scalefactor to decrease the amount of correction that will be applied from the linear correction table.

7. A system for compensating for a non-linear response from a touch sensor when a pitch between electrodes is approximately equal to or wider than the width of the pointing object making contact, said system comprised of:
   a touch sensor having a orthogonal array of X and Y electrodes disposed in two parallel planes, one plane directly over the other plane, wherein the pitch between electrodes on the same plane is approximately equal to or wider than the width of the pointing object as measured by the touch sensor;
   means in the touch sensor for measuring a size of the pointing object that is detected by the touch sensor;
   means in the touch sensor for determining a scale factor relative to the measured size of the pointing object so that the linear correction table may be used for correcting a measured position of the pointing object;
   a linear correction table in the touch sensor that is calibrated for a predetermined size of an object that will experience non-linearity on the touch sensor; and
   means in the touch sensor for applying the scale factor to the linear correction table to find an amount of correction to be applied to the measured position of the pointing object to determine an actual position relative to the first axis and the measured size of the pointing object.

* * * * *